United States Patent [19]

Graff et al.

[11] 3,756,357
[45] Sept. 4, 1973

[54] SHOCK ABSORBER AND VALVE ASSEMBLY

[75] Inventors: Kurt Graff, Geyen/Koln, Bundersrepublik Deutschland, Germany; Jan Mathijs Antoon Winjnhoven, Truiden, Belgium

[73] Assignee: Monroe Belgium N.V., Sint-Truiden, Belgium

[22] Filed: Dec. 30, 1971

[21] Appl. No.: 213,960

[52] U.S. Cl.............. 188/282, 137/513.3, 188/317
[51] Int. Cl............................................. F16f 9/348
[58] Field of Search.................. 188/282, 317, 319, 188/320; 137/513.3

[56] References Cited
UNITED STATES PATENTS

| 2,732,039 | 1/1956 | Funkhouser et al............ | 188/282 |
| 2,546,051 | 3/1951 | Whisler, Jr..................... | 188/317 X |

FOREIGN PATENTS OR APPLICATIONS

| 867,905 | 5/1961 | Great Britain..................... | 188/317 |

Primary Examiner—George E. A. Halvosa
Attorney—Harness, Dickey & Pierce

[57] ABSTRACT

A hydraulic direct-acting telescopic shock absorber having an improved valve mechanism incorporating a plurality of valve disks each having flow control orifices which function to reduce the hydraulic "swish" noise produced during operation of the shock absorber.

11 Claims, 4 Drawing Figures

PATENTED SEP 4 1973
3,756,357
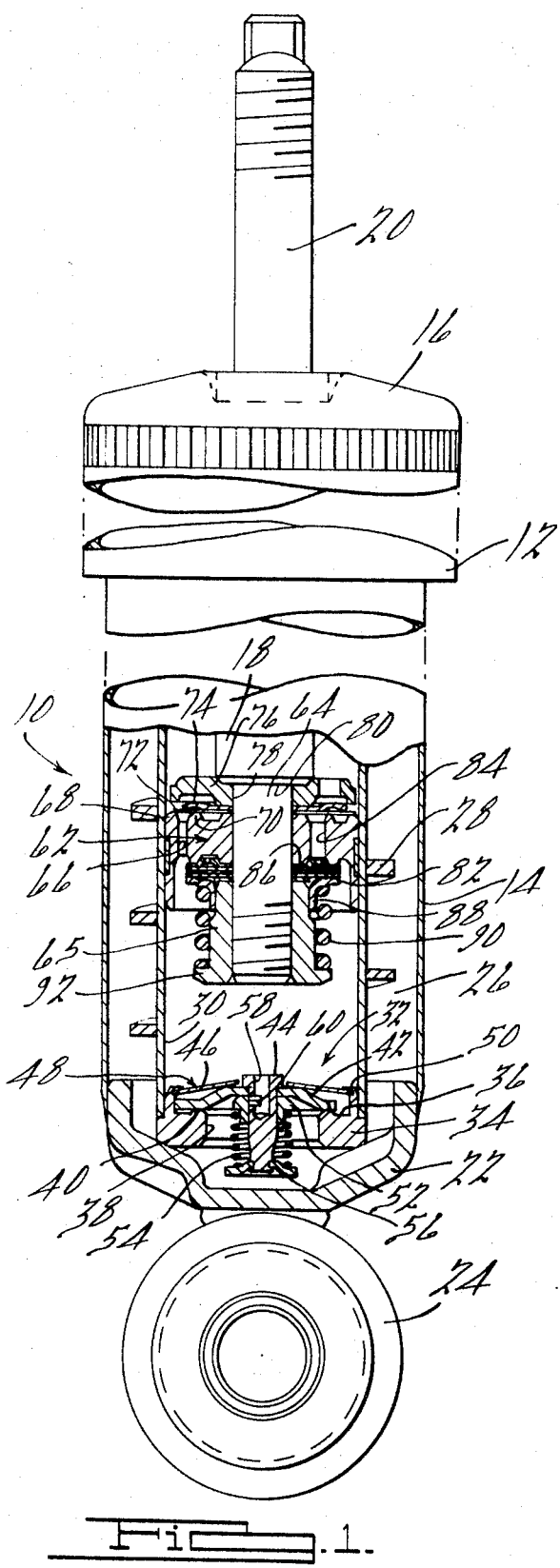
INVENTORS.
Kurt Graef.
Jan Mathijs Antoon Wijnhoven
BY Harness, Dickey & Pierce
ATTORNEYS.

SHOCK ABSORBER AND VALVE ASSEMBLY

BACKGROUND OF THE INVENTION

It has heretofore been the practice in direct-acting hydraulic shock absorbers to utilize a reciprocating piston which is provided with a first valve means for controlling the rebound damping characteristics of the shock absorber unit, and a second valve means for controlling compression characteristics of the unit. With regard to the rebound damping capability of a shock absorber, it has further been the practice to utilize a valve member which moves toward and away from a valve seat, whereby to open and close a fluid passage through the piston. The valve member heretofore has been provided with a flow orifice which is communicable with the flow passage and through which fluid flows at low piston velocity, with the valve member being movable to an open position at a higher piston velocity to permit fluid flow through the fluid passage in the piston. The performance characteristics achieved with a particular flow orifice in the valve member can be calculated to provide a predetermined loading, and where higher loading is required, a smaller flow orifice is employed. One problem, however, exists in connection with the use of small diameter orifices and thus resides in the fact that although smaller orifices provide for higher loading, they produce an undesirable audible "swishing" noise during operation of the shock absorber.

Generally speaking, the present invention provides a new and improved shock absorber incorporating a novel valve mechanism which enables the use of a valve arrangement wherein higher loading can be achieved, without the attendant swish noise that has heretofore been objectionable. Basically, the present invention achieves the new and improved results by providing a combination of valve elements which permits the building up of a load at low speeds in two steps through the use of a plurality of orifices associated with a pair of serially arranged flow passages, as will hereinafter be described in detail.

SUMMARY OF THE INVENTION

The present invention relates generally to hydraulic shock absorbers and, more particularly, to a new and improved shock absorber assembly having a novel valve arrangement for reducing the noise produced during operation thereof. The valve arrangement utilizes a plurality of different size flow orifices which function during the rebound cycle to control extension of the piston rod of the shock absorber. The aforesaid orifices are arranged and dimensioned so as to define fluid flow passages which communicate hydraulic fluid from a location above the piston to a position therebelow in a manner so as to significantly reduce the "swish" noise attendant the operation of prior known shock absorbers.

It is accordingly a general object of the present invention to provide a new and improved shock absorber assembly.

It is a more particular object of the present invention to provide a shock absorber assembly having reduced noise producing characteristics.

It is yet a more particular object of the present invention to provide a direct-acting telescopic shock absorber which is provided with a new and improved valve mechanism for reducing the "swish" noise produced during the rebound cycle of prior known shock absorbers.

It is still another object of the present invention to provide a new and improved valve mechanism for hydraulic shock absorbers which may be used with either disk or helical type valve springs.

It is still another object of the present invention to provide a new and improved hydraulic shock absorber having a novel valve arrangement which is of a simple design, is economical to manufacture, and will have a long and durable operational life.

Other objects and advantages of the present invention will become apparent from the following detailed description taken in conjunction with the accompanying drawing.

BRIEF DESCRIPTION OF THE DRAWING

FIG. 1 is a longitudinal cross-sectional view of a shock absorber assembly embodying the principles of the present invention;

FIG. 2 is an enlarged fragmentary cross-sectional view of the valve mechanism incorporated in the shock absorber shown in FIG. 1;

FIG. 3 is a fragmentary cross-sectional view, similar to FIG. 2, and illustrates another embodiment of the present invention, and FIG. 4 is a fragmentary cross-sectional view, similar to FIGS. 2 and 3, and illustrates yet another embodiment of the present invention.

DETAILED DESCRIPTION OF THE PREFERRED EMBODIMENTS

Referring now in detail to the drawing, and in particular to FIG. 1, a shock absorber assembly 10, in accordance with one preferred embodiment of the present invention, is shown as comprising upper and lower, generally tubular shaped, concentrically and telescopically oriented members 12 and 14. As is conventional, the members 12, 14 are longitudinally movable relative to one another and are adapted for operative attachment between the sprung and unsprung portions of an associated vehicle or the like. The upper end of the member 12 is provided with a generally cup-shaped end cap member 16 which is fixedly secured to the member 12 and is also attached to a central, axially upwardly extending piston rod 18 adapted to be secured by means of a mounting stud or the like 20 to one of the aforementioned associated vehicle portions. The lower end of the member 14 is provided with a similar type, generally cup-shaped end cap member 22 that is fixedly secured to the member 14 and is provided with a ring-like attachment member 24 adapted to be secured to the other of the associated vehicle portions. The opposite (upper) end of the tubular member 14 is also provided with a cup-shaped end cap member (not shown) which is formed with a central aperture through which the piston rod 18 extends and with the member 14 defines an annular fluid reservoir 26. A generally helically shaped baffle member 28 is provided within the reservoir 26 and functions to reduce fluid aeration in the reservoir 26, as is well known in the art.

The inner periphery of the reservoir 26 is defined by a concentrically oriented pressure cylinder 30, the lower end of which is provided with a compression valve assembly 32 that consists of a head 34 having a portion extending into the end of the cylinder 30 in secured relation thereto. The head 34 is formed with an annular recess 36 on the upper side thereof which defines with a central axially extending aperture 38, an upwardly extending valve seat 40. A washer-like valve member 42 rests upon the valve seat 40 and is secured to a central valve element 44 that is urged downwardly by spring fingers 46 of a spring disk 48 which is secured in position by a coined edge 50 on the upper side of the head 34. The element 44 is provided with a slidable sleeve 52 which is urged upwardly by a coil spring 54 against the underside of the valve member 42. The lower end of the spring 54 is supported by an annular retaining member 56, as illustrated. The element 44 is formed with a central passageway 58 communicating with an outlet slot 60 which is in turn communicable with the lower side of the valve assembly upon downward movement of the sleeve 52 against resistance of the spring 54, whereby to permit fluid to pass between the lower end of the cylinder 30 and the reservoir 26.

A piston member, generally designated 62, is mounted on a lower, reduced diameter end portion 64 of the piston rod 18 and is adapted to be secured thereon by a suitable threadably mounted retaining nut 65. The piston member 62 is provided with a plurality of circumferentially spaced, radially outermost oriented set of longitudinally extending apertures 66 which are located between a pair of radially spaced, concentric valve seats 68 and 70 provided on the upper end of the member 62. The valve seats 68, 70 are cooperable with and adapted to be engaged by a relatively thin, disk-like valve member 72 which functions to close the upper ends of the apertures 66 when the piston rod 18 is moved upwardly within the pressure cylinder 30. A spring disk 74 is disposed directly above the valve member 72 and is adapted to resiliently urge the latter toward the valve seats 68, 70. A retaining member 76 is disposed above the spring disk 74 and is formed with a central aperture 78 through which the piston rod end portion 64 extends, the member 76 being fixed adjacent a radially extending shoulder 80, as illustrated.

An annular valve seat 82 is provided on the lower side of the piston member 62 and is positioned radially outwardly from a plurality of circumferentially spaced, longitudinally extending apertures 84, the valve seat 82 being adapted for engagement with a thin disk-like valve member 86 whidh is urged toward the valve seat 82 by means of an annular sleeve member 88 that is slidable along the outer periphery of the nut 65 and is adapted to be urged upwardly a helical coil spring 90. As illustrated, the upper end of the spring 90 bears against the sleeve member 88, while the lower end thereof bears against a radially outwardly extending flange portion 92 formed on the lower end of the nut 65. It will be seen that when the piston member 62 is moved upwardly within the pressure cylinder 30, fluid under pressure will move downwardly through the apertures 84, thereby opening the valve member 86 and permitting fluid to pass into the area below the piston 62.

Referring to FIG. 2, the valve member 86 is formed with an upwardly projecting embossed or raised portion 94 at a position directly below each of the passages 84, with the portion 94 associated with each of the passages 84 being provided with a longitudinally aligned flow orifice or aperture 96. Disposed directly below the valve member 86 in an annular orifice plate 98 which is formed with a plurality of flow orifices 100 that are spaced and arranged one subjacent each of the orifices 96. The orifice plate 98 is separated from the sleeve member 88 by means of a pair of generally disk-shaped intermediate spacer members 102 and 104 which, together with the valve member 86 and orifice plate 98, are retained on the lower end of the piston rod 18 by means of the nut 65. In accordance with the present invention, the size of the orifices 100 are somewhat larger than the associated orifices 96 and as such, provide less resistance to fluid flow therethrough.

In operation, the piston member 62 normally reciprocates upwardly and downwardly within the pressure cylinder 30, with downward movement during the compression stroke serving to open the valve member 72 against the resistance of the spring 74 to permit fluid to flow upwardly through the passages 66 to a position above the piston member 62. During upward movement of the piston member 62 during the rebound cycle of the shock absorber 10, at high piston velocity, the spacer members 102, 104, as well as the orifice plate 98 and valve member 86 will be biased downwardly against the resistance of the spring 90, thereby unseating the valve member 86 from the valve seat 82. This of course, permits fluid to flow through the apertures 84 to a position below the piston member 62. During upward movement of the piston member 62 at low piston velocity, fluid will flow through the apertures 84 and then through the plurality of apertures 96 in the valve member 86 and finally through the flow orifices 100 in the plate 98.

The above described construction has been found to substantially reduce the swish noise during the rebound stroke or cycle and this is accomplished by virtue of the fact that through the provision of the apertures 96 and orifices 100, a low noise level may be maintained at higher pressures, as compared with prior known piston constructions which utilized only a single, relatively small diameter orifice in cooperative relation with the apertures 84 in the associated piston member.

With reference to FIG. 3, it will be noted that the present invention is readily adapted for use with piston members which utilize disk type valve springs as opposed to coil type springs, such as the spring 90 shown in FIGS. 1 and 2. As shown in FIG. 3, the piston member 62 may be provided with an annular spacer ring 106 which is mounted between the upper side of the retaining nut 65 and the lower side of a pair of spring disks 107, the spring disks 107 in turn being mounted subjacent the orifice plate 98 and valve plate 86, as illustrated. The upper side of the member 106 is formed with a radially outwardly and downwardly tapered or inclined upper surface 108 which accommodates downward movement of the outer periphery of the spring disks 107. The disks 107 are fabricated of a conventional spring steel or the like so that during a high velocity rebound cycle, and thereby normally resiliently biases the valve member 86 into engagement with the valve seat 82. In operation, the apertures 96 and orifices 100 in the valve member 86 and orifice plate 98, respectively, function in the above described manner to minimize swish noise during the rebound cycle.

FIG. 4 illustrates another embodiment of the present invention wherein the piston member 62 is provided with first and second axially spaced rebound valve assemblies 110 and 112 which are similar in construction to each other and to the rebound valve arrangement shown in FIG. 3, with the result that four different orifice disks are utilized to even further reduce swish noise in comparison with the two disks shown in FIG. 3. More particularly, the piston member 62 is provided with a generally cylindrical shroud or enclosure member 114 which comprises a cylindrical axially extending section 116 spaced radially outwardly from the piston rod section 64 and terminating at the lower end thereof in an integral, radially extending section 118 that is formed with a plurality of apertures 120 which are circumferentially arranged therearound and axially aligned one with each of the plurality of apertures 84 in the piston member 62. An annular valve seat 122 is formed around the lower side of the radial section 118 of the shroud 114 and is cooperable with the valve assembly 112 in a manner hereinafter to be described.

The valve assembly 110 is located interiorly of the shroud 114 and comprises an annular valve member 124 which is similar in construction to the valve member 86 and is provided with recessed areas 126 having orifices 128 in registry with apertures 84 in the piston member 62. The valve member 124 is operatively associated with an annular orifice plate 130 which is disposed directly below the valve member 124 and is provided with enlarged diameter orifices 132 arranged in registry with the apertures 138. A pair of annular spring disks 134 and 136, analogous to the spring disks 107, are disposed directly below the orifice plate 130 and function to resiliently bias the valve member 124 into engagement with the valve seat 82. Disposed directly below the spring disk 136 is a radially outwardly tapered spacer ring 138 which is adapted to be retained on the piston rod section 64 by a suitable retaining nut 140 and thereby permit downward peripheral movement of the spring disks 134, 136 during a rebound cycle. The valve assembly 112 is generally identical in constuction and operation to the assembly 110 and comprises a valve member, orifice plate and spring disk identified by like numerals with a prime suffix, i.e., 124', 134', 136', with the members 124' and 134' being provided with aligned apertures 128' and 132', respectively. As illustrated, the members 124', 134' and 136' are operatively retaining upon the lower end of the piston rod section 64 by means of a tapered annular ring 138' and a retaining nut 65. It will be seen that the valve assemblies 110 and 112 are serially arranged so that during a rebound cycle, fluid will flow first through the apertures 84 in the piston member 62, around or through the valve member 124 and orifice plate 134, then through the interior of the shroud 114 and through the apertures 120 and finally through or around the valve member 124' and orifice plate 134'.

It will be seen from the foregoing description that the present invention provides a novel shock absorber construction wherein through the use of cooperative orifice or valve plates in the rebound valve, swish noise which has long been an objectionable characteristic of prior shock absorber devices is substantially decreased without in any way seriously affecting the cost or other design criteria of the unit. By virtue of the fact that the shock absorber of the present invention is of a relatively simple design, it will be economical to manufacture, easy to assemble and will have a long and effective operational life.

While it will be apparent that the preferred embodiments illustrated herein are well calculated to fulfill the objects above stated, it will be appreciated that the present invention is susceptible to modification, variation and change without departing from the scope of the invention.

1. In combination in a hydraulic shock absorber,
    a pressure cylinder,
    a piston reciprocable within said cylinder and separating the interior thereof into first and second chambers,
    means defining at least one axially extending fluid passage in said piston and communicating said chambers,
    a valve assembly on said piston for controlling the flow of fluid through said passage,
    said valve assembly including an annular axially extending valve seat on one axial end of said piston and spaced radially outwardly from said passage,
    a first valve disc disposed directly adjacent said one end of said piston and having one axial side thereof adapted for engagement with said valve seat,
    a first fluid flow orifice extending axially through said first valve disc and arranged in general serial communication with said fluid passage in said piston,
    a spring assembly resiliently biasing said first valve disc axially toward said piston, whereby said one axial side of said first valve disc is engaged with said valve seat to block fluid flow between said valve seat and said first valve disc,
    a second annular valve disc disposed between and extending generally radially of said first valve disc and said spring assembly,
    a second fluid flow orifice extending axially through said second valve disc and having at least a portion thereof displaced generally radially from said first flow orifice and communicating with one of said chambers defined by the confronting axial sides of said first valve disc and said spring assembly,
    said passage and said first and second fluid flow orifices being serially communicable, whereby fluid may pass from one of said chambers axially through said passage and thereafter axially through said first orifice and finally radially through said second orifice into the other of said chambers.

2. The invention as set forth in claim 1 wherein said first orifice means is generally axially aligned with said passage and wherein said second fluid flow orifice provides less flow resistance to fluid passing therethrough than said first fluid flow orifice.

3. The invention as set forth in claim 1 wherein said spring assembly comprises a coil spring mounted on said piston.

4. The invention as set forth in claim 1 wherein said spring assembly comprises at least one spring disc on said piston.

5. The invention as set forth in claim 1 which includes a second valve assembly on said piston substantially identical to said first defined valve assembly and serially arranged therewith, whereby fluid flowing from one of said chambers will sequentially flow through said passage, said first and second orifices of the said first defined valve assembly, the first and second orifices of the second valve assembly and thereafter into the other of said chambers.

6. The invention as set forth in claim 1 which includes a generally flat annular element interposed between said spring element and said second valve disc and defining in part said second fluid flow orifice.

7. The invention as set forth in claim 1 wherein a portion of said first valve disc is offset axially toward one end of said passage and has said first fluid flow orifice formed therein.

8. The invention as set forth in claim 1 wherein said valve assembly is operable during a rebound cycle of the shock absorber.

9. The invention as set forth in claim 1 which includes means defining a second flow passage in said piston communicating with said first mentioned flow passage, a second valve assembly substantially identical to said first defined valve assembly and serially arranged therewith, whereby fluid flowing from one of said chambers will sequentially flow through said passage, said first and second orifices of the said first defined valve assembly, the first and second orifices of the second valve assembly and thereafter into the other of said chambers.

10. The invention as set forth in claim 9 which includes partition means for separating fluid flow between said first and second passages from the interior of said pressure cylinder.

11. The invention as set forth in claim 10 wherein said partition means comprises a generally cylindrically shaped enclosure arranged concentrically of said pressure cylinder, said enclosure being mounted on said piston member and comprising a generally axially extending annular section and a radially extending section, said radially extending section having said second fluid passage extending therethrough, means providing a valve seat for said second passage, said second valve assembly including first and second valve discs substantially identical to said first and second valve discs, respectively of said first defined valve assembly and being serially arranged with respect to said first and second valve discs of said first valve assembly, with all of said valve discs being cooperable to reduce the swish noise produced during the rebound cycle of said shock absorber.

* * * * *